United States Patent
Felgenhauer

(10) Patent No.: US 11,247,928 B2
(45) Date of Patent: Feb. 15, 2022

(54) PLUNGER ASSEMBLY FOR A GLASS MOLDING MACHINE

(71) Applicant: Heye International GmbH, Obernkirchen (DE)

(72) Inventor: Benedikt Felgenhauer, Herford (DE)

(73) Assignee: Heye International GMBH, Obernkirchen (DE)

( * ) Notice: Subject to any disclaimer, the term of this patent is extended or adjusted under 35 U.S.C. 154(b) by 618 days.

(21) Appl. No.: 16/093,195

(22) PCT Filed: Apr. 20, 2018

(86) PCT No.: PCT/EP2018/000215
§ 371 (c)(1),
(2) Date: Oct. 12, 2018

(87) PCT Pub. No.: WO2018/210444
PCT Pub. Date: Nov. 22, 2018

(65) Prior Publication Data
US 2021/0214258 A1 Jul. 15, 2021

(30) Foreign Application Priority Data
May 15, 2017 (DE) .......................... 10 2017 004 627.1

(51) Int. Cl.
*C03B 9/193* (2006.01)
*C03B 9/38* (2006.01)
(52) U.S. Cl.
CPC .......... *C03B 9/1934* (2013.01); *C03B 9/1936* (2013.01); *C03B 9/3816* (2013.01)
(58) Field of Classification Search
None
See application file for complete search history.

(56) References Cited

U.S. PATENT DOCUMENTS

| | | | |
|---|---|---|---|
| 1,977,743 A * | 10/1934 | Soubier | C03B 9/3816 65/215 |
| 4,339,258 A * | 7/1982 | Martin | C03B 7/16 65/79 |

(Continued)

FOREIGN PATENT DOCUMENTS

EP   1525166 A1   4/2005

OTHER PUBLICATIONS

International Preliminary Search Report dated Nov. 19, 2019 in related application PCT/EP2018/000215.

*Primary Examiner* — Lisa L Herring
(74) *Attorney, Agent, or Firm* — Fox Rothschild LLP; Gary A. Hecht

(57) ABSTRACT

A plunger assembly for a glass forming machine comprises an assembly housing (6), at which a drive (17) is in contact with a drive spindle, which is supported in an axially non-displaceable manner, via an angular gear, which drive spindle, in turn, engages with a spindle nut, the spindle nut housing (18) of which is set up via an assembly (19) by interpositioning pressing force limiters for transferring the pressing force required for a forming process to two plungers (1, 2). The assembly (19) can be displaced in a non-rotatable manner along two guide columns (7, 8), which are arranged parallel to one another in a housing-fixed manner, and the spindle nut housing (18) engages with two lateral linear guides, which are also arranged in a housing-fixed manner. The connection between the assembly (19) and the spindle nut housing (18) is designed in such a way that only forces in the direction of the pressing force are transferred, so that any other forces and moments originating from the forming process are transferred to the housing, so that in particular the drive spindle is only axially stressed.

20 Claims, 17 Drawing Sheets

(56) References Cited

U.S. PATENT DOCUMENTS

| | | |
|---|---|---|
| 7,340,923 B2 | 3/2008 | Bogert et al. |
| 2005/0252245 A1 | 11/2005 | Bogert et al. |
| 2014/0109618 A1 | 4/2014 | Kuz et al. |

* cited by examiner

PLUNGER ASSEMBLY FOR A GLASS MOLDING MACHINE

BACKGROUND

The invention relates to a plunger assembly for an individual section glass forming machine, also known as an I.S. glass forming machine.

Such a plunger assembly is known from EP 1 525 166 B1 (see related U.S. Pat. No. 7,340,923). It consists of a plurality of plungers supported on piston rods, and all of which are supported by means of a plunger holder each on a joint traverse by interpositioning a pressing force limiter which is represented by a piston-cylinder unit, to which compressed air can be applied. The plungers are in each case held in a plunger assembly by means of a longitudinally divided split ring, wherein support cylinders, on which the split ring is radially supported and which, in turn, are fastened to a first housing, are centered by the plunger holders. The traverse is held inside the first housing on a threaded spindle, which is arranged centrally as well as non-rotatably and which engages with a spindle nut, which can be driven by means of a first drive, and which can be driven relative to the first housing for the purpose of displaying a lower rest position, a middle loading position, as well as an upper press position of the plunger.

Lateral guide rods are assigned to the traverse, which, in the same way as the central threaded spindle, absorb the reaction forces resulting from the pressing process in the form of bending moments. The same applies for the forces, which are introduced into the threaded spindle by the first drive for advancing said threaded spindle. This first drive is connected to the spindle nut via an angular gear.

The first housing is displaceably arranged inside a second housing, which surrounds it and is arranged in a machine-fixed manner by means of a second drive for adaptation to different height dimensions of the hollow glass articles, which are to be produced. The traverse, together with the plunger holders and the pressing force limiters, hereby forms a unit. To detect a mass of a gob, which is too large or too small, which is to be formed, displacement sensors are attached to the first housing on the one side and on such parts on the other side, which are moved by means of the mentioned piston rod. However, only position changes of the piston rod relative to the first housing can be determined with said displacement sensors.

For the height adjustment of the entire plunger assembly, a pipe cylinder, which is provided with an external thread and which can be driven via a gear drive, is provided.

To supply the plungers with cooling air and the pressing force limiters with compressed air, supply pipes are attached to the bottom of the second housing, which end in a connecting block on the bottom side and which are in contact with the traverse via telescopic intermediate pipes, via which the transfer to the plungers as well as the pressing force limiters takes place.

SUMMARY OF THE INVENTION

In this context, it is the object of the invention to design a plunger assembly of the above-identified type in a simple way with regard to a more stress-oriented flow of force as well as an improved detection of movements in the context of the forming process. In the case of such a plunger assembly this object is solved by means of the features of the characterizing part of claim 1.

According to this, it is essential for the invention that the pressing force limiters are combined in an assembly, which is arranged uniformly vertically and non-rotatably in a movable manner along guide columns. To generate the pressing force required for the forming process, a drive is provided, which is coupled to a drive spindle, which is supported inside the assembly housing in an axially non-displaceable manner, which, in turn, engages with a spindle nut supported in a spindle nut housing. The spindle nut housing is arranged in a movable manner inside the housing via lateral guides, in particular linear guides, parallel to the guide columns. The connection between the spindle nut housing and the mentioned assembly is set up with the proviso that only pressing forces, thus forces acting in the pressing direction, but not transverse forces, are transferred perpendicular to the drive spindle, or bending moments, respectively, or other reaction forces and moments resulting from the forming process are transferred. Such reaction forces are created for example as a result of an uneven mass distribution or also of an uneven temperature distribution of the at least two molds as well as the molten glass masses, which are introduced therein, so that the pressing process is associated with correspondingly different pressing forces, which are to be applied via the plungers. As a result of the non-rotatable guide of the mentioned assembly as well as of the spindle nut housing, such reaction forces can be deflected reliably to the housing, so that a transverse force-free operation of the drive spindle is ensured at least independently of the distribution of the pressing forces on different plungers.

The drive spindle is supported on structural elements of the housing in an axially non-displaceable manner according to additional features of the invention. The bottom thereof as well as intermediate bottoms lend themselves for this purpose. A spindle nut is accordingly arranged in an axially movable manner along the drive spindle and the corresponding movement of a spindle nut housing is used according to the invention to transfer pressing forces.

The mentioned guide columns are arranged in a housing-fixed manner according to the features of another embodiment. The mentioned assembly, among others, which accommodates the pressing force limiters, can be displaced along said guide columns, and they are equipped to deflect transverse forces on the housing, which might appear in addition to a guidance of the assembly.

According to the features of another embodiment, the connection between the assembly, which accommodates the pressing force limiters, and the spindle nut housing, is equipped to the effect that a transverse force-free displacement of the assembly and of the spindle nut housing is at hand.

According to other features, the drive intended to apply the pressing force, is arranged on the housing. Differing from the above-presented prior art, a drive, which is movably arranged according to the pressing process, thus does not exist.

A gear, in particular an angular gear, provided as a coupling member between the mentioned drive and the drive spindle, is advantageous, but not absolutely necessary, so that a direct connection of the drive to the drive spindle is possible.

Bushings, intended to guide the plungers, can be provided. These are fastened to a base plate, the height position of which is arranged so as to be adjustable relative to the housing for the adaptation to different dimensions of the hollow glass articles to be produced, in particular the height dimensions thereof. Differing from the above-presented prior art, there is thus no connection between the bushings and the housing.

Additional features are directed to a possible embodiment of a drive for the height adjustment of the base plate. The drive is fastened to the housing and is in contact with the base plate via two spindle lifting gears and two spindles, which are parallel to one another. Both spindle lifting gears are connected via a coupling shaft. The base plate experiences a stable guidance by means of the mentioned guide columns.

Pressing force limiters be provided which are characterized by double-acting cylinders, the active surfaces of which are embodied as ring piston, wherein the cylinder spaces located on the bottom are in contact with the plungers for the transfer of pressing forces.

The mentioned cylinders can be simultaneously equipped to guide cooling air to the plungers.

In yet another feature of the invention, used cooling air flows as exhaust air from the plungers into an exhaust air block fastened to the base plate, and can be discharged from said exhaust air block via an exhaust air pipe, which acts as collecting line.

According to still more features, each plunger is provided with a magnetic measuring element, which is in each case in operative connection in a contact-free manner with a position sensor, which is attached in a housing-fixed manner, for the position determination. The path of each plunger can be detected individually in this way and can be displayed as electrical, in particular digital signal. This opens up a variety of further evaluating options, wherein for example a pressing function can be determined. In addition, this measuring system can be used to adjust the height of the bushings with respect to a defined level.

According to other features, an assembly comprising at least the plungers is arranged inside the housing so as to be adjustable in a horizontal plane, wherein drives are in each case assigned to the adjusting movements. In the simplest case, these adjusting movements can be two partial movements, which are perpendicular to one another. An exact setting option of the position and thus of the site of action of the plunger can be displayed in this way. A drive can be formed at this location by each system, which is known to the person of skill in the art.

According to the features of additional embodiments, the drives are arranged on the housing and are in operative connection with the mentioned assembly via a spindle. The spindle is advantageously arranged on the outer side of the housing in an easily accessible manner.

The setting position of the assembly in the mentioned horizontal plane can be fixed according to other features. For this purpose, any fastening elements, which are known to the person of skill in the art, for example based on a screw-connection, can be used.

According to the features of still another embodiment, the displacement paths of the assembly in the mentioned horizontal plane are limited by stop edges or similar functional elements.

BRIEF DESCRIPTION OF THE FIGURES

The invention will be described in more detail below with reference to the enclosed drawings.

DETAILED DESCRIPTION

Figure 1:
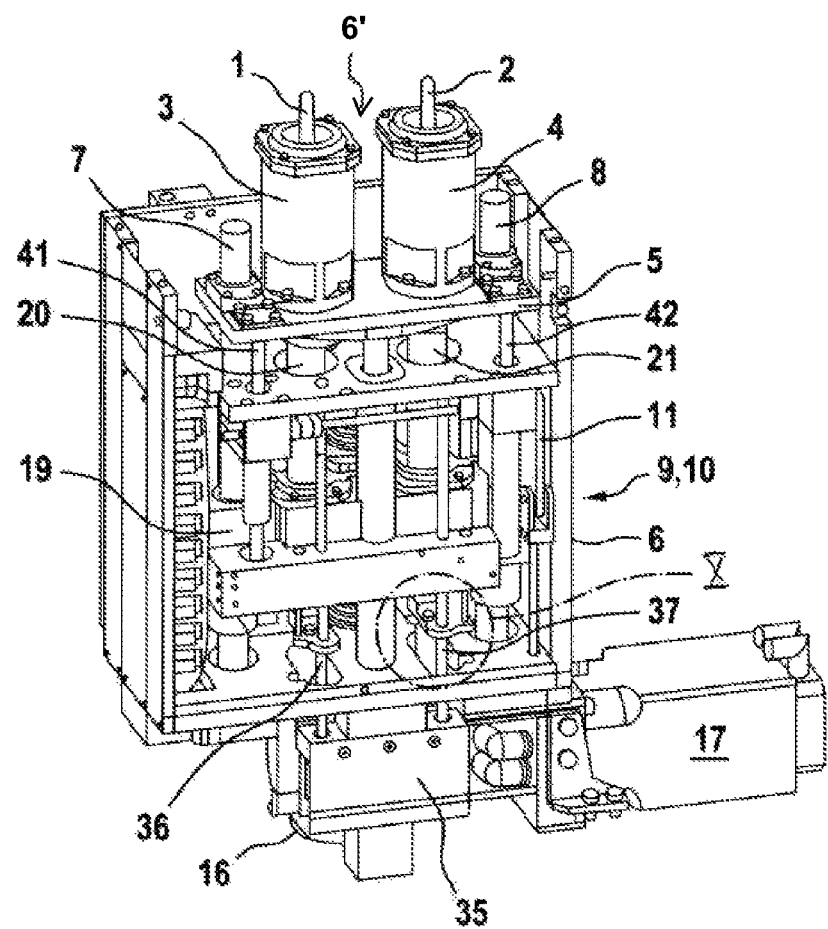
FIG. 1 shows a perspective open front-side illustration of a plunger assembly.
Figure 2:
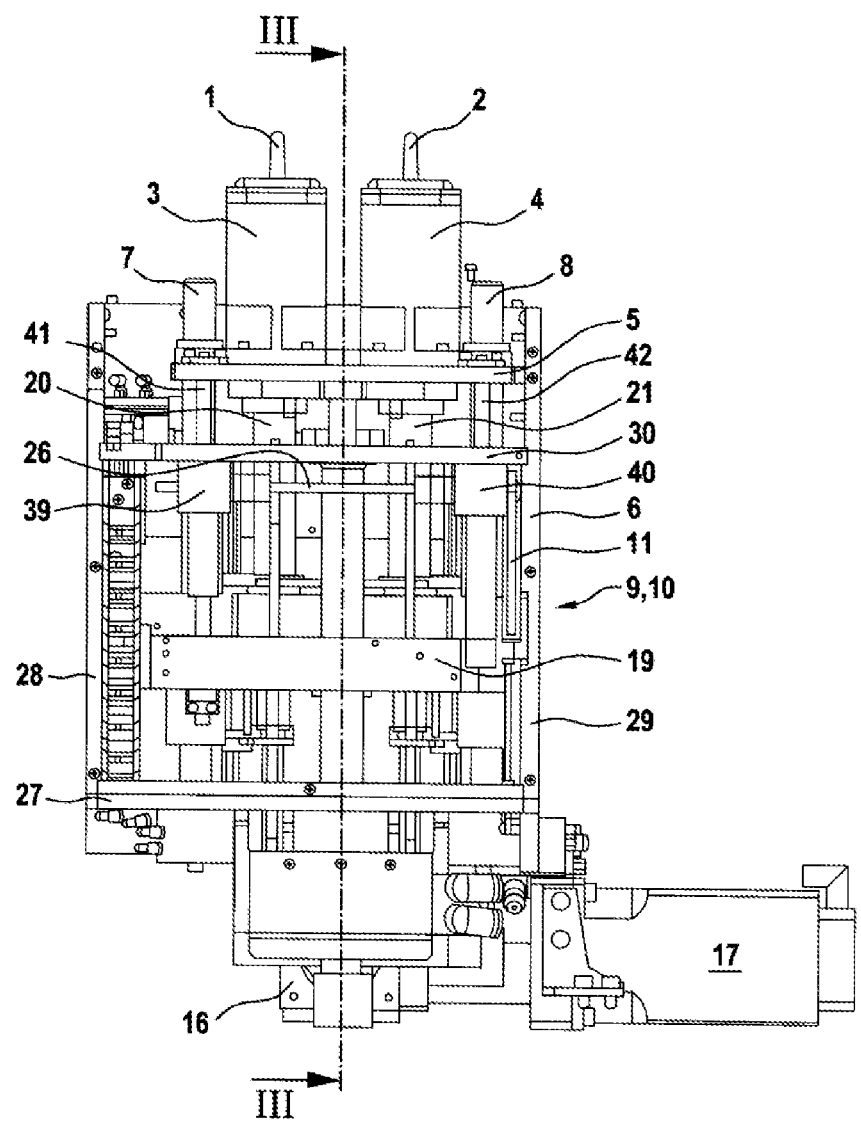
FIG. 2 shows an illustration of a flat front-side view of the plunger assembly according to FIG. 1.
Figure 3:
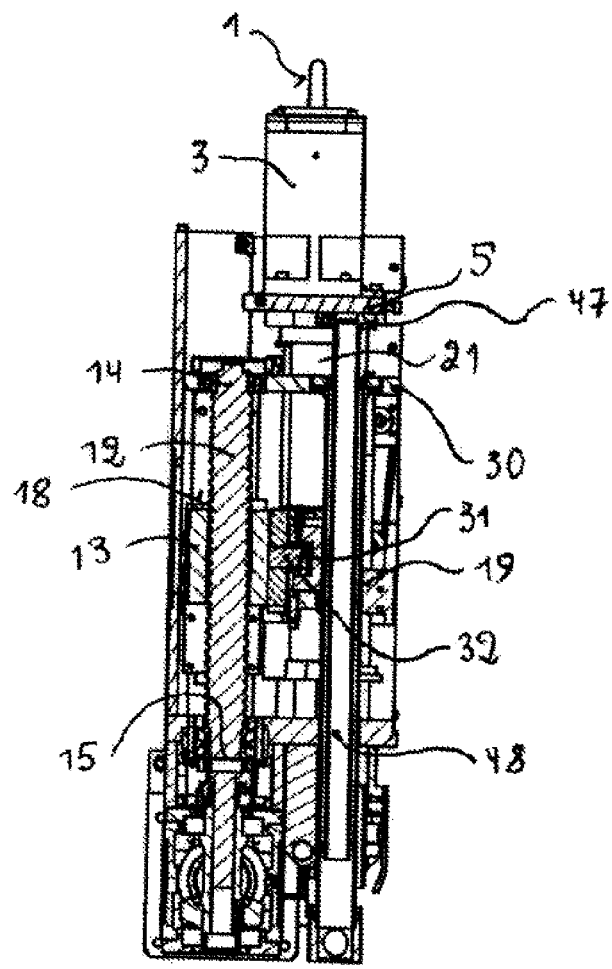
FIG. 3 shows a sectional illustration of the plunger assembly in a plane III-III of FIG. 2.
Figure 4:
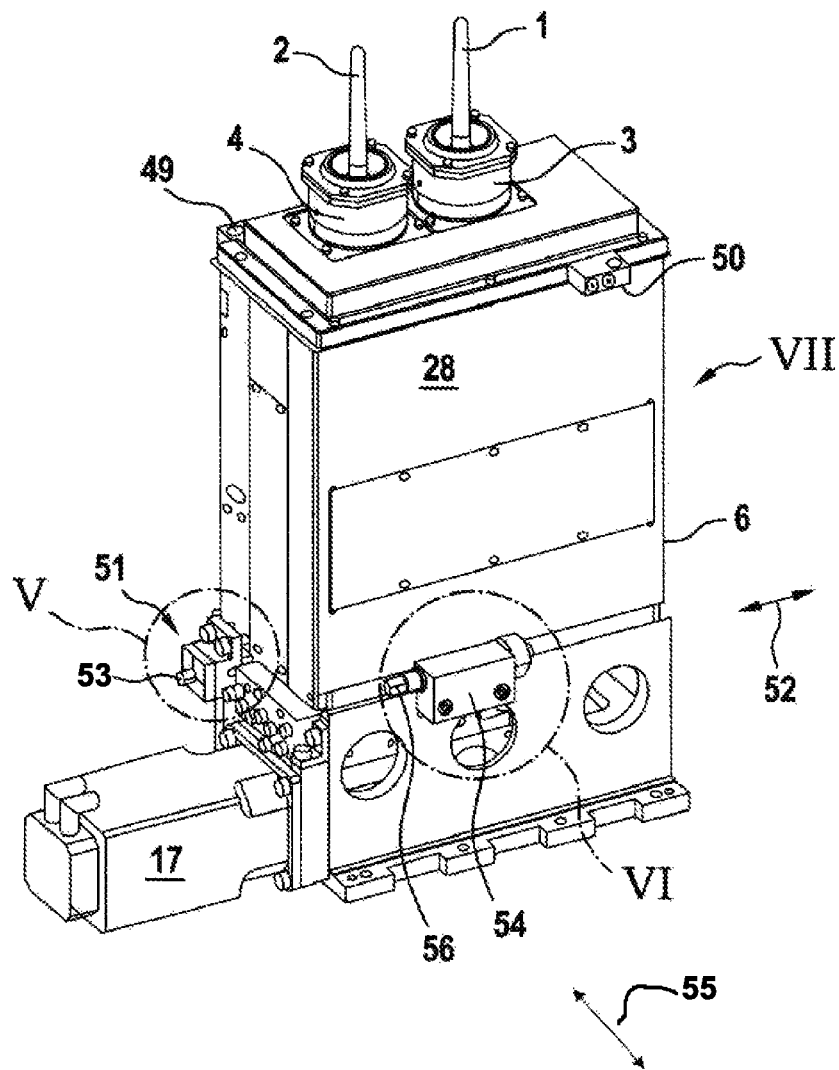
FIG. 4 shows a perspective closed rear-side illustration of a plunger assembly.
Figure 5:
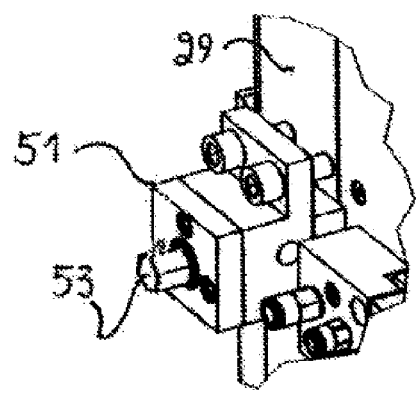
FIG. 5 shows an enlarged illustration of a detail V of FIG. 4.
Figure 6:
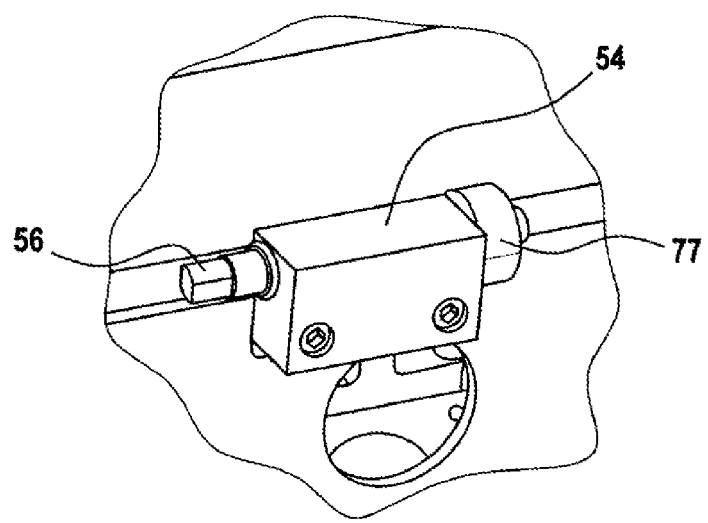
FIG. 6 shows an enlarged illustration of a detail VI of FIG. 4.
Figure 7:
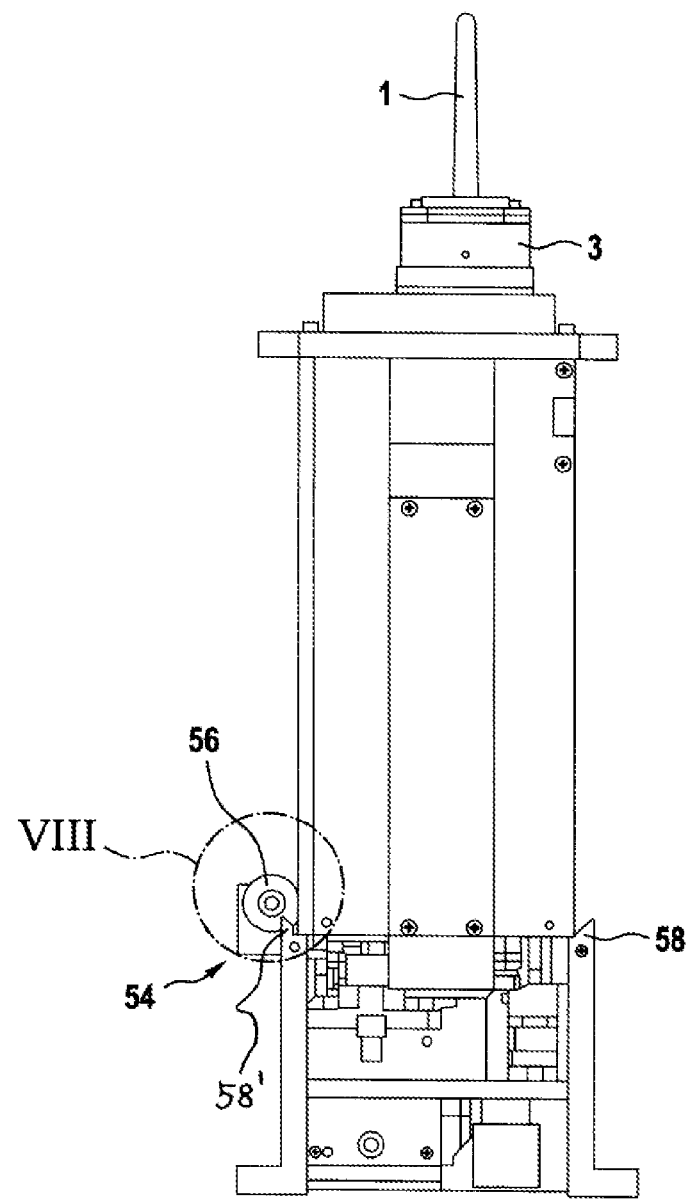
FIG. 7 shows a flat illustration of the plunger assembly according to a viewing direction VII of FIG. 4.
Figure 8:
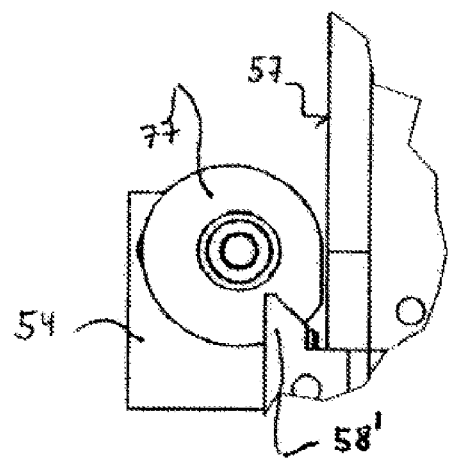
FIG. 8 shows an enlarged illustration of a detail VIII of FIG. 7.
Figure 9:
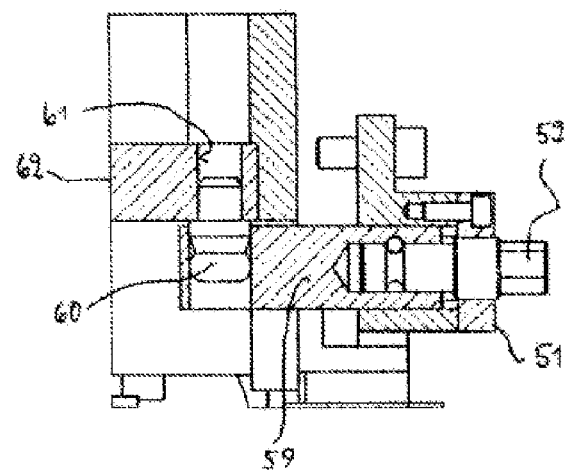
FIG. 9 shows a flat sectional illustration of an adjusting drive of the plunger assembly.
Figure 10:
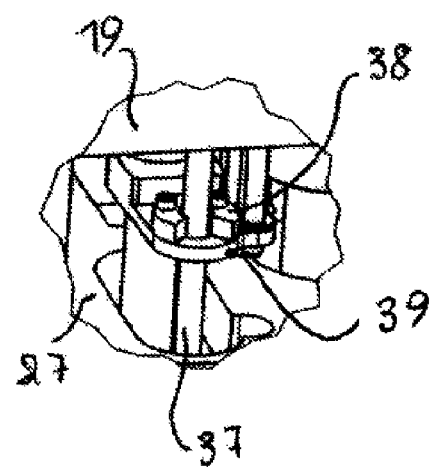
FIG. 10 shows an enlarged perspective illustration of a detail X of FIG. 1.
Figure 11:
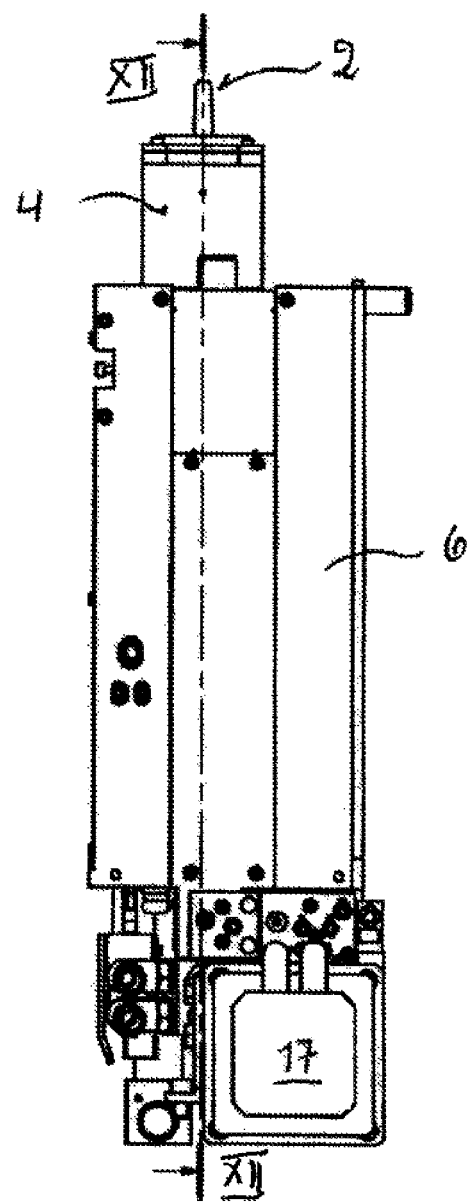
FIG. 11 shows an illustration of a flat view of the plunger assembly according to a viewing direction XI of FIG. 12.

Reference is initially made to the illustrations according to FIGS. 1 to 3. They show a plunger assembly, which is intended for a double drop operation. The plunger assembly includes plungers 1, 2 which are axially guided and centered in a bushing 3, 4 in each case.

Both bushings 3, 4 are fastened to a base plate 5, which, in turn, is arranged in a height-adjustable manner with respect to an assembly housing 6 along two guide columns 7, 8 for the purpose of adaptation to different dimensions of the hollow glass articles to be treated. A drive 9 for the height adjustment is located at the location 10 and is in contact with a horizontally extending coupling shaft via a traction drive 11, via which the rotational movement of the drive 9 is transferred as lifting movement to the base plate 5 by means of two end-side spindle lifting gears 39, 40 as well as non-rotating spindles 41, 42.

The assembly housing 6 consists essentially of a base plate 27 (FIG. 2), side walls 28, 29 and an intermediate bottom 30, and is intended and set up for mounting to a machine frame of an Individual Section glass molding machine (also referred to herein as an I.S. glass molding machine).

For the explanation of the horizontal positioning of the components of the plunger assembly, which is arranged on the base plate 5 and is vertically movable with respect to the assembly housing 6, reference will be additionally made below to FIGS. 4 to 8.

Reference numbers 49, 50 identify fixing points, which are attached to the upper area of the assembly housing 6, and which are intended and configured to provide for a screw-connection of the plunger assembly to the assembly housing 6 after the horizontal adjustment of the position of the plunger assembly has taken place. The plunger assembly is thus arranged so as to be capable of being set in a horizontal plane with respect to the assembly housing 6 and can be fixed in the respectively set positions.

Reference number 51 identifies a positioning unit, which is configured for adjustment in the directions 52, thus in the longitudinal direction of the housing 6 and which is arranged on the assembly housing 6. The drive connection to the plunger assembly is illustrated by means of a spindle 53 and will be explained in more detail below.

Reference number 54 identifies a further positioning unit, which is set up for adjustment in the directions 55, thus in the transverse direction of the housing 6, perpendicular to the directions 52, and which is also arranged on the housing 6. The drive connection to the plunger assembly, in turn, is illustrated by means of a spindle 56 and will be explained in more detail below.

The positioning unit 54 is equipped with an eccentric 77 (FIG. 8), which is in operative connection with a mating surface 57 of the plunger assembly, so as to move the latter in the one of the two directions 55 in accordance with its rotation angle position. A movement in the opposite direction can be illustrated in the same way or in another manner, which is known to the person of skill in the art. Reference numbers 58, 58' identify machine-fixed stop edges, which limit the movement of the plunger assembly in the directions 55.

The positioning unit 51 is fastened to the assembly housing 6 and the spindle 52 thereof is in operative connection with a push rod 59, wherein an engagement of the spindle 52 and of the push rod 59 can be set up for example in the manner of the operating principle of a circulating ball spindle, hereby generating a linear movement of the push rod in accordance with the rotation of the spindle. However, other design forms for displaying a linear movement of the push rod are not ruled out.

The push rod 59 is set up to carry out a feed movement in the directions 52 via a driving pin 60, which engages with a bore 61 of a component 62, which is in fixed connection with the plunger assembly.

An adjustment of the position of the plunger assembly in a horizontal plane is thus possible after releasing the screw-connections on the fixing points 49, 50, assisted by the positioning units 51, 54. By tightening the screw-connections on the fixing points again, the position of the plunger unit is secured.

Figure 13:
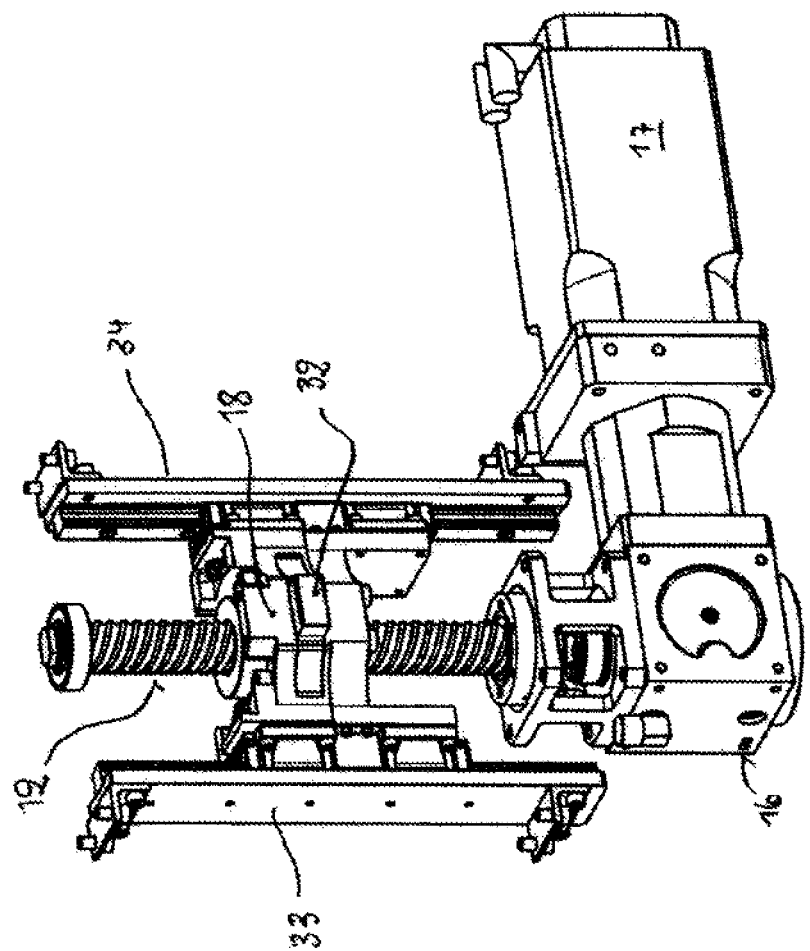
FIG. 13 shows an enlarged perspective partial illustration of a plunger drive.
Figure 14:
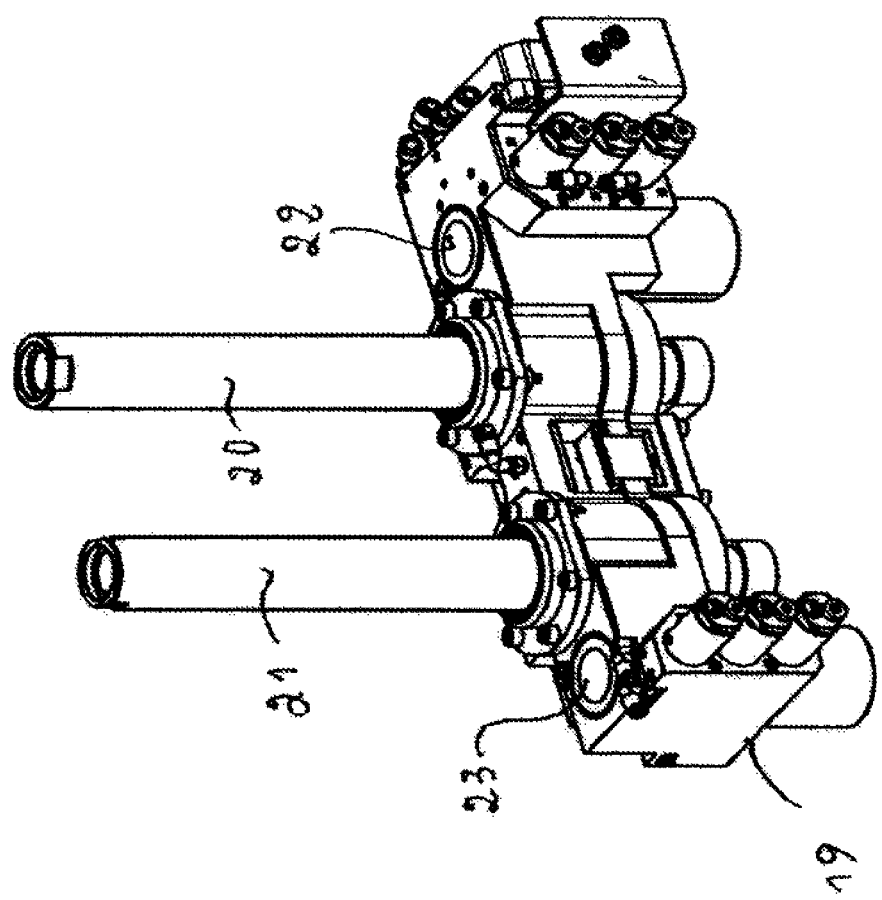
FIG. 14 shows an enlarged perspective partial illustration of a front-side view of an assembly, which is intended for the pressing force transfer.
Figure 15:
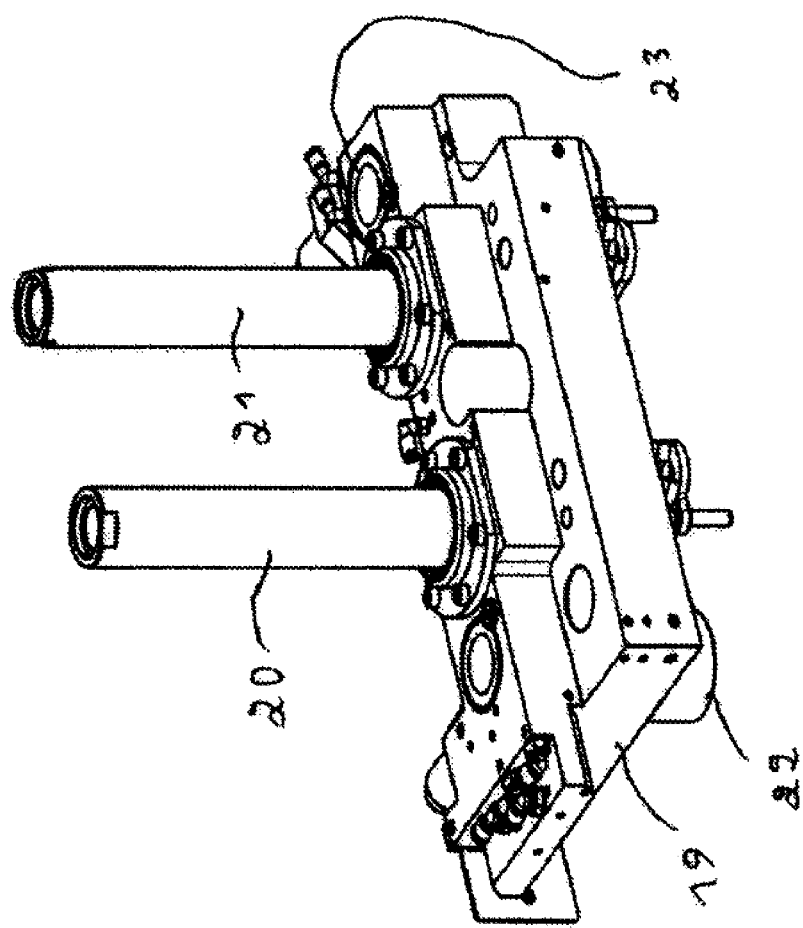
FIG. 15 shows an enlarged perspective partial illustration of a rear-side view of the assembly according to FIG. 14.
Figure 16:
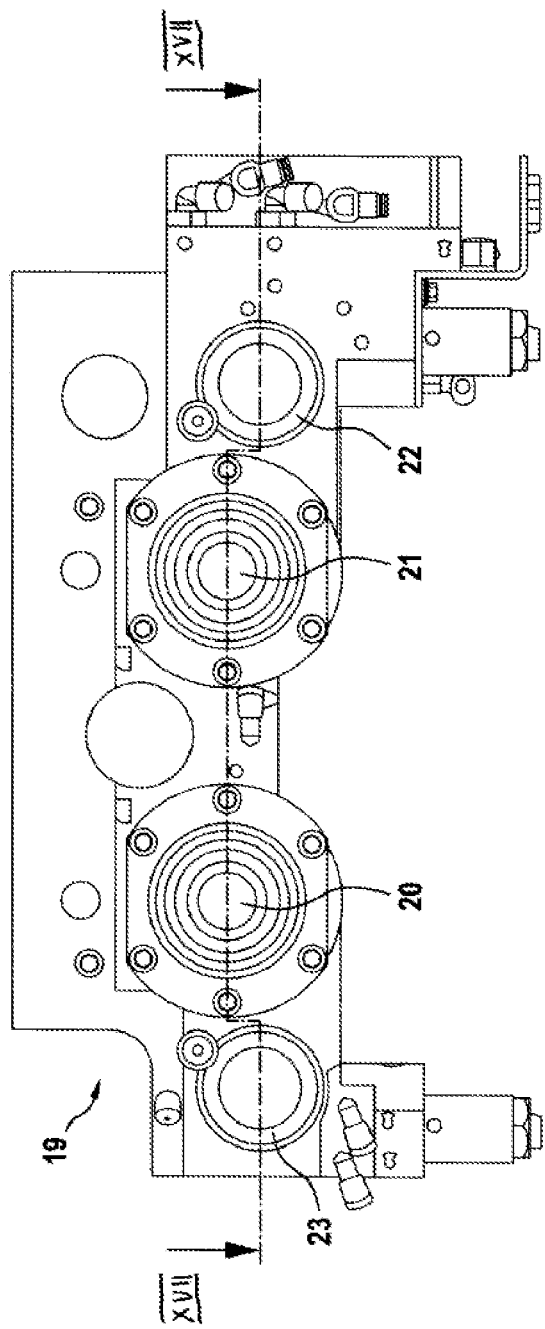
FIG. 16 shows a flat illustration of a top view onto the assembly according to a viewing direction XVI of FIG. 17.

Reference number 12 identifies a drive spindle (see, e.g., FIGS. 3 and 13), which is supported so as to be capable of being rotated about a vertical axis and which engages with a spindle nut 13. On its upper end 14, the drive spindle 12 is supported in an axially non-displaceable manner in the intermediate bottom 30, and in the area of its lower end 15 in the base plate 27, and is in contact with a drive 17, which is arranged on the assembly housing 6, via an angular gear 16. The angular gear 16 as well as the drive are arranged below the base plate 27.

The spindle nut 13 is accommodated in a rotationally fixed manner in a spindle nut housing 18, which, in turn, is in contact with an assembly 19, in which cylinders 20, 21, which are arranged parallel and vertically to one another, are accommodated. The cylinders 20, 21 are in driving connection with the plungers 1, 2 and serve to transfer the pressing force as well as to accommodate the pressing force limiters, which will be described below. For this purpose, reference will additionally be made below to the drawing FIGS. 5 to 11, in which functional elements, which correspond to those of FIGS. 1 to 4, are numbered accordingly, so that a corresponding repeated description can be forgone.

The connection between the assembly 19 and the spindle nut housing 18 is illustrated by means of a driving tag 32, which is held on the spindle housing 18 and engages with a recess 31 of the assembly 19, and via which the pressing force required for the molding process is thus transferred.

Figure 12:
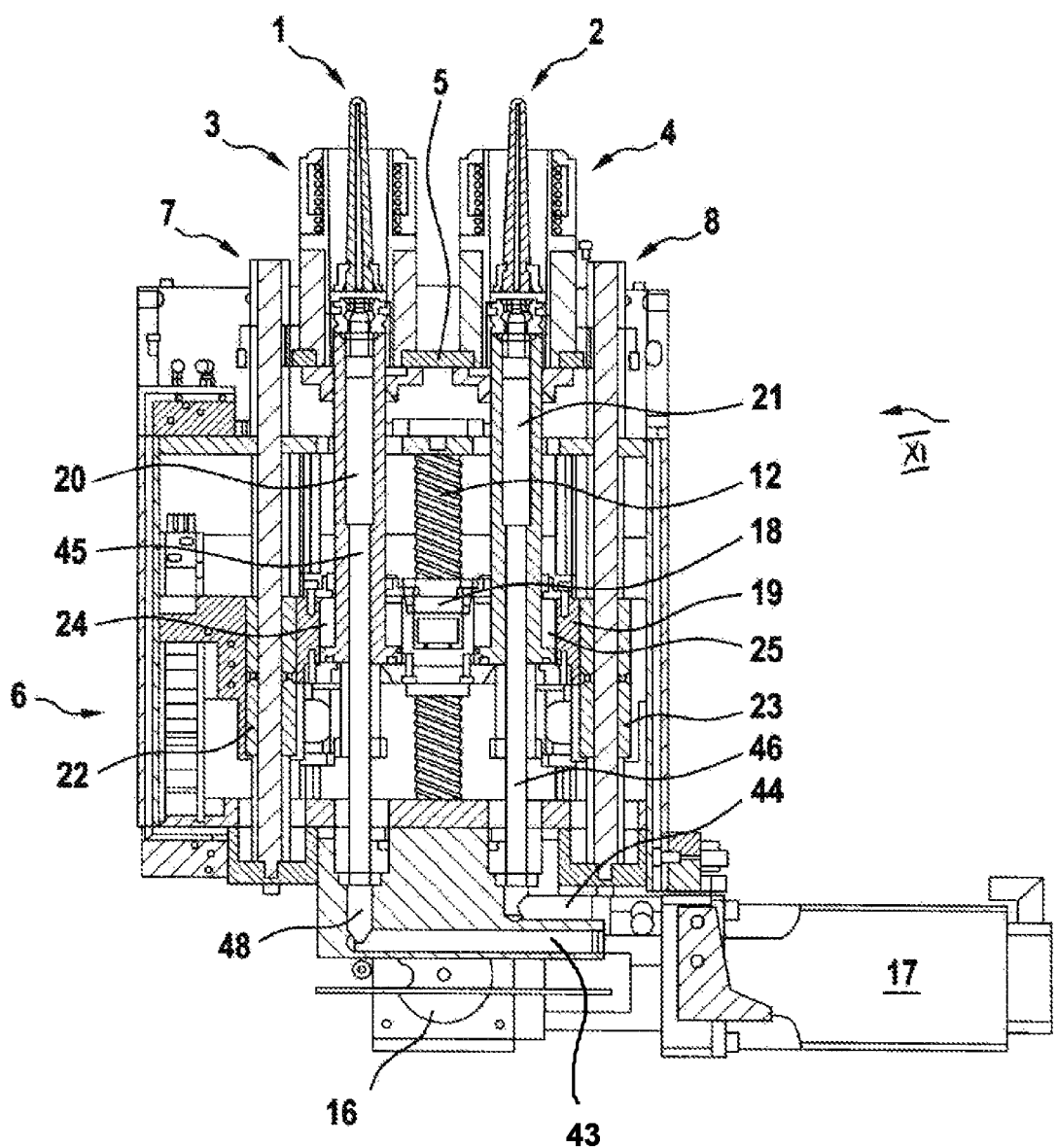
FIG. 12 shows a sectional illustration of the plunger assembly according to a plane XII-XII of FIG. 11.
Figure 17:
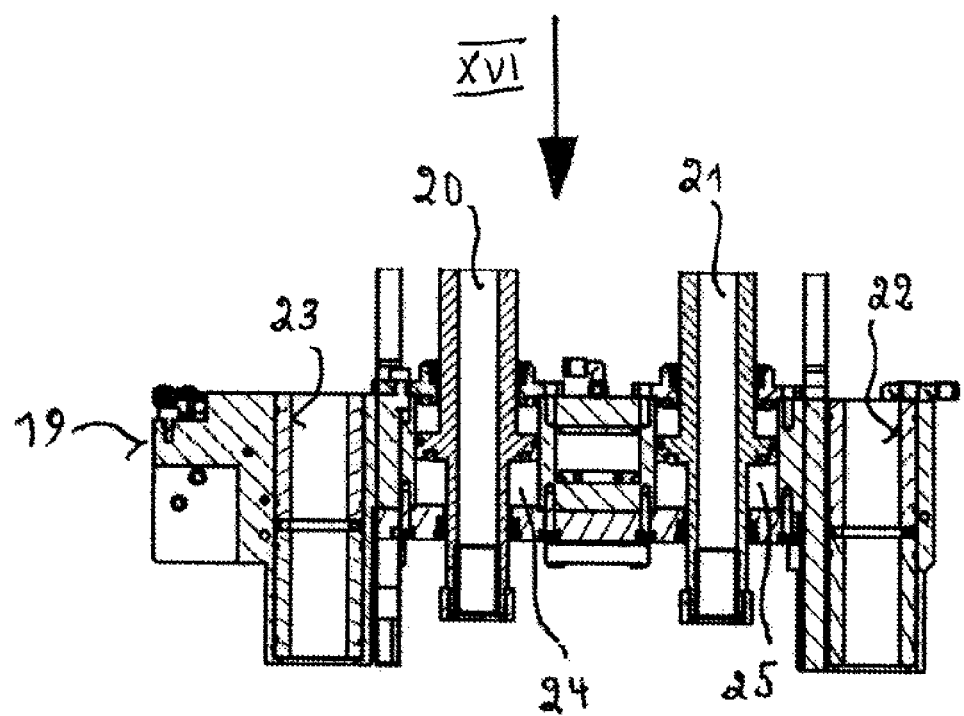
FIG. 17 shows a sectional illustration of the assembly according to a plane XVII-XVII of FIG. 16.

The cylinders 20, 21 are axially supported via piston-cylinder units, which act as pressing force limiters 24, 25 (see FIGS. 12 and 17), on the assembly 19, which is movably arranged in a non-rotatable manner along the guide columns 7, 8 by interpositioning guide sleeves 22, 23. Forces, which result from the forming process and which have a retroactive effect on the assembly 19, are transferred to these guide columns 7, 8 in this way and are thus diverted to the housing 6.

Reference numbers 33, 34 identify linear guides, which are fastened in the assembly housing 6 on the inside and which engage with corresponding mating elements of the spindle nut housing 18. An at least essentially torque-free guidance of the spindle nut housing 18 results in this way, because transverse forces, which result from the forming process, are transferred to the housing 6 via the linear guides 33, 34.

Reference number 35 (see FIG. 1) identifies a holder for a position measuring device, which is fastened to the assembly housing 6 and which is set up to fix position measuring systems 36, 37, which are in each case assigned to the plungers 1, 2 and which are thus in each case arranged in a housing-fixed manner, and which are intended for the contact-free interaction with movably arranged measuring elements 38. The measuring elements 38 are in contact with the plungers 1, 2. The position measuring systems 36, 37 are preferably magnetostrictively acting systems and the measuring elements 38 are thus magnets. The measuring element 38, which is thus movable, is arranged on a holder 39, which, in turn, is in contact with the facing end of the cylinder 20, 21, for example screwed thereto. However, other measuring systems, which are known to the person of skill in the art and which are based on other physical operating principles, are not excluded at this point.

Reference numbers 43, 44 identify air supply ducts for cooling air, which are introduced via tube elements 45, 46, which protrude into the cylinders 20, 21 on the bottom side, and which develop a cooling effect in the area of the plungers 1, 2 in a manner, which is known per se. The used cooling air of the two plungers 1, 2 is collected in an exhaust air block 47 directly below the base plate 5 and is discharged via an exhaust air pipe 48.

It can be seen that the pressing force required for the forming process is transferred to the plungers 1, 2 via the drive 17, the angular gear 16, the drive spindle 12, the spindle nut housing 18 as well as the assembly 19, but that relative movements are possible between the plungers 1, 2 as a result of the pressing force limiters 24, 25.

The operating principle of such pressing force limiters is known and is based on a counter pressure, which is built up by means of compressed air. Detail illustrations of a compressed air supply have thus been forgone at this point.

It can further be seen that neither the bushings 3, 4, nor the pressing force limiters 24, 25 are in direct contact with the drive spindle 12. In departing from the above-presented prior art EP 1 525 166 B1, a traverse also does not exist, which forms a structural unit with the bushings.

It can finally be seen that, also in departing from the above-introduced prior art, neither the angular gear 16 nor the drive 17 assigned thereto are fastened to a displaceable housing or another displaceable assembly. In the context of the forming process, only a structural unit 6' consisting of the spindle nut housing 18, the assembly 19 and the plungers 1, 2 supported via the pressing force limiters 24, 25 on the latter, are thus displaceable with respect to the assembly housing 6.

A pressing mechanism, which is set up for the press & blow method, has been described above. However, the invention can equally also be used for a blow & blow method. For this purpose, reference is made to FIG. 18.

It shows two blank molds 63, 64, which in each case consist of mold halves, in the closed position, which each enclose a forming space 65, 66, which is in each case in contact with a piston rod head 71, 72 via an opening ring 67, 68, as well as a split ring 69, 70 in a positive manner. The split ring 69, 70 is embodied so as to be longitudinally divided in a known manner and serves for the axial fixation of a plunger 73, 74 each, which is located in the blow position according to the drawing.

Each of the two piston rod heads 71, 72, which is embodied so as to be hollow, is in contact with a piston rod 75, 76, which is also embodied so as to be hollow, in a known manner, so that a continuous flow path into the respective forming space 65, 66 results for the blowing air in this position of the plungers 73, 74, starting at the piston rod 75, 76 via the respective piston rod head 71, 72, bores of the plungers 73, 74, which are not illustrated, and an annular gap 77, 78, which surrounds the forming space-side end of the plunger. The parison can be blown out in this position.

To retrofit a press & blow method into a blow & blow method and vice versa, only an exchange of the plungers 73, 74 as well as of the piston rod heads 71, 72 is thus required.

Figure 18:
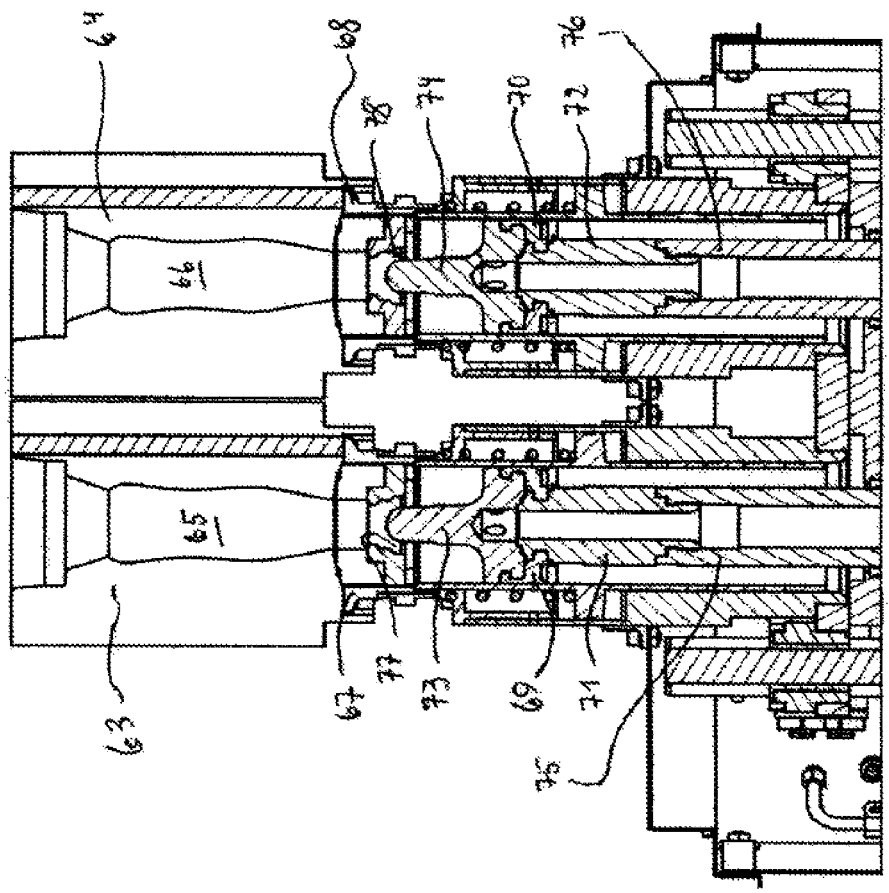
FIG. 18 shows an illustration of a pressing mechanism set up for a use for a blow & blow method in the blowing position.
Figure 19:
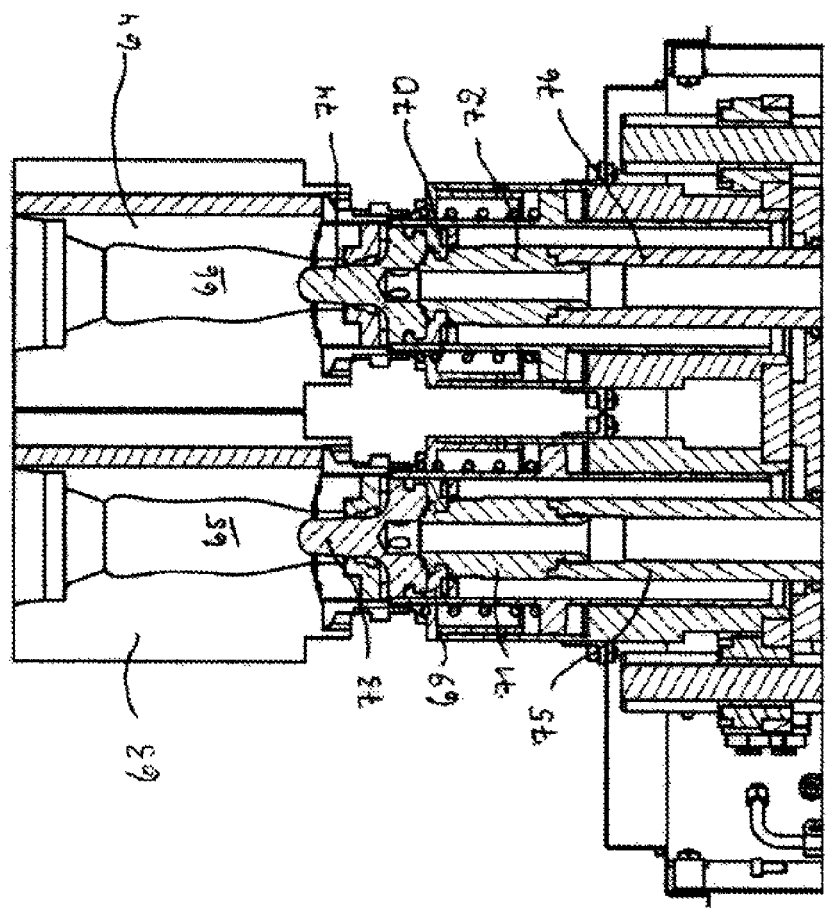
FIG. 19 shows an illustration of the pressing mechanism according to FIG. 18 in the blow-down position.

FIG. 19 shows the pressing mechanism according to FIG. 18 in the blow-down position, in which the forming molding space 65, 66 is closed on the bottom side or, in the opening area of the hollow glass article to be produced, respectively, by the respective plunger 73, 74, and into which a gob, which is subsequently pressed against the closed bottom of the forming space 65, 66 by being blown down, is introduced on the upper side.

| List of Reference Numerals: | |
| --- | --- |
| 1. | plunger |
| 2. | plunger |
| 3. | bushing |
| 4. | bushing |
| 5. | base plate |
| 6. | assembly housing |
| 6'. | Structural unit |
| 7. | guide column |
| 8. | guide column |
| 9. | drive |
| 10. | location |
| 11. | traction drive |
| 12. | drive spindle |
| 13. | spindle nut |
| 14. | end, upper |
| 15. | end, lower |
| 16. | angular gear |
| 17. | drive |
| 18. | spindle nut housing |
| 19. | assembly |

| List of Reference Numerals: | |
| --- | --- |
| 20. | cylinder |
| 21. | cylinder |
| 22. | guide sleeve |
| 23. | guide sleeve |
| 24. | pressing force limiter |
| 25. | pressing force limiter |
| 26. | coupling shaft |
| 27. | base plate |
| 28. | side wall |
| 29. | side wall |
| 30. | intermediate bottom |
| 31. | recess |
| 32. | driving tag |
| 33. | linear guide |
| 34. | linear guide |
| 35. | holder |
| 36. | position measuring system |
| 37. | position measuring system |
| 38. | measuring element |
| 39. | spindle nut gear |
| 40. | Spindle lifting gears |
| 41. | spindle |
| 42. | spindle |
| 43. | air supply duct |
| 44. | air supply duct |
| 45. | tube element |
| 46. | tube element |
| 47. | exhaust air block |
| 48. | exhaust air pipe |
| 49. | fixing point |
| 50. | fixing point |
| 51. | positioning unit |
| 52. | directions |
| 53. | spindle |
| 54. | positioning unit |
| 55. | directions |
| 56. | spindle |
| 57. | mating surface |
| 58. | stop edge |
| 58'. | stop edge |
| 59. | push rod |
| 60. | driving pin |
| 61. | bore |
| 62. | component |
| 63. | blank mold |
| 64. | blank mold |
| 65. | forming space |
| 66. | forming space |
| 67. | opening ring |
| 68. | opening ring |
| 69. | split ring |
| 70. | split ring |
| 71. | piston rod head |
| 72. | piston rod head |
| 73. | plunger |
| 74. | plunger |
| 75. | piston rod |
| 76. | piston rod |
| 77. | Eccentric |

The invention claimed is:

1. A plunger assembly for an I.S glass forming machine comprising,
    an assembly housing;
    at least two plungers movably arranged with respect to said assembly housing for carrying out a forming process;
    a drive spindle supported by the assembly housing in an axially non-displaceable manner so as to be rotatable about its axis;
    a drive in operative connection with said drive spindle to generate a pressing force to be transferred to the at least two plungers; and an assembly guidable along guide columns for movement in a vertical and non-rotatable manner and which assembly includes pressing force limiters that comprise piston-cylinder units, said assembly being in contact with a spindle nut housing that engages with the drive spindle to transfer pressing forces to the at least two plungers, and wherein the spindle nut housing is in contact with the assembly housing via lateral linear guides, thereby preventing forces transverse to the pressing forces from affecting the drive spindle.

2. The plunger assembly according to claim 1, wherein the drive spindle has an upper end supported in an intermediate bottom of the assembly housing, and a lower end supported in a base plate of the assembly housing.

3. The plunger assembly according to claim 1, wherein said guide columns are arranged in a fixed position relative to said assembly housing.

4. The plunger assembly according to claim 1, wherein the connection between the assembly and the spindle nut housing is configured such that any reaction forces from the molding process, with the exception of the pressing force, are transferred to the guide columns and the lateral linear guides.

5. The plunger assembly according to claim 1, wherein the drive is fastened to the assembly housing.

6. The plunger assembly according to claim 5, wherein the drive is in contact with the drive spindle via an angular gear.

7. The plunger assembly according to claim 1, wherein the at least two plungers are centered within bushings that are fastened to a base plate, said base plate being arranged in a height-adjustable manner relative to the assembly housing for the purpose of adaptation to different dimensions of hollow glass articles to be formed.

8. The plunger assembly according to claim 7, wherein said base plate is height-adjustable relative to said assembly housing by a drive configured to move at least two spindles which in turn are configured to move said base plate and which said at least two spindles are parallel to one another.

9. The plunger assembly according to claim 8, wherein the at least two spindles are in contact with the drive configured to move at least two spindles via spindle lifting gears and a coupling shaft, and wherein the drive configured to move at least two spindles is fastened to the assembly housing.

10. The plunger assembly according to claim 7, wherein the base plate and assembly are movably guided along said guide columns.

11. The plunger assembly according to claim 1, wherein the pressing force limiters include cylinders, each of said cylinders having outer sides forming a ring piston on its one end, wherein said cylinders are in contact with the at least two plungers on their other ends.

12. The plunger assembly according to claim 11, wherein piston rods of the cylinders are configured to guide cooling air to the at least two plungers.

13. The plunger assembly according to claim 7, further comprising an exhaust air block attached to said base plate for collecting used cooling air and which is configured to direct said used cooling air to an exhaust air pipe.

14. The plunger assembly according to claim 1, wherein each of said at least two plungers is in contact with a measuring element for measuring a position thereof and which measuring element is configured for contact-free interaction with a position measuring system-fixed relative to said housing.

15. The plunger assembly according to claim 14, wherein each said measuring element and the position measuring system are part of a magnetic system.

16. The plunger assembly according to claim 1, wherein a structural unit comprising said at least two plungers in addition to drive elements assigned thereto, are arranged inside the assembly housing so as to be adjustable relative to the assembly housing in a horizontal plane.

17. The plunger assembly according to claim 16, further comprising two drives, which are separated from one another and which are fastened to the assembly housing and are assigned to the structural unit for an adjustment in the horizontal plane.

18. The plunger assembly according to claim 16, wherein the structural unit is in operative connection with the respective drive via a spindle.

19. The plunger assembly according to claim 16, characterized in that the structural unit is arranged relative to the assembly housing so as to be capable of being fixed in the horizontal plane.

20. The plunger assembly according to claim 16, further comprising stop edges acting to limit the movement of the at least two plungers in the horizontal plane by limiting the displacements of the structural unit.

* * * * *